ered by Ralph R. Roberts

United States Patent [19]
Persson

[11] 3,724,304
[45] Apr. 3, 1973

[54] APPARATUS FOR DEBURRING A METAL STRIP

[76] Inventor: Henry Persson, 224 Glenwood Avenue, Bloomfield, N.J. 07003

[22] Filed: Jan. 3, 1972

[21] Appl. No.: 214,680

[52] U.S. Cl. ........................... 83/3, 83/425, 83/914
[51] Int. Cl. ........................... B26d 3/02, B26d 7/06
[58] Field of Search....83/3, 425, 431, 433, 435, 914, 83/916; 51/78; 90/24 B, 24 D, 24 F

[56] References Cited

UNITED STATES PATENTS

| 3,377,896 | 4/1968 | De Corta | 83/914 X |
| 1,958,001 | 5/1934 | Heim | 51/78 X |

*Primary Examiner*—Andrew R. Juhasz
*Assistant Examiner*—Leon Gilden
*Attorney*—Ralph R. Roberts

[57] ABSTRACT

This invention discloses apparatus for conditioning the edge as by deburring of a continuously fed metal strip such as is provided in the slitting of a large strip into many narrow strips. Other strips requiring deburring occur when shearing sheets into strips. The burr or sharp edge or edges on said strip is removed by advancing the strip by a powered roller while at the same time bringing the edge in way of a rotating cup-shaped cutting disc or a scraping cutting blade. A non-powered deburring apparatus may be used with the powered apparatus so that its deburring means is brought in way of the other edge which is deburred in the same manner as the powered deburring apparatus. Rectangular and square sheets can also be deburred with the apparatus of this invention.

9 Claims, 12 Drawing Figures

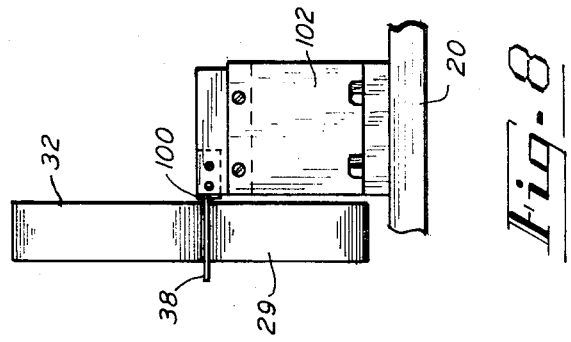
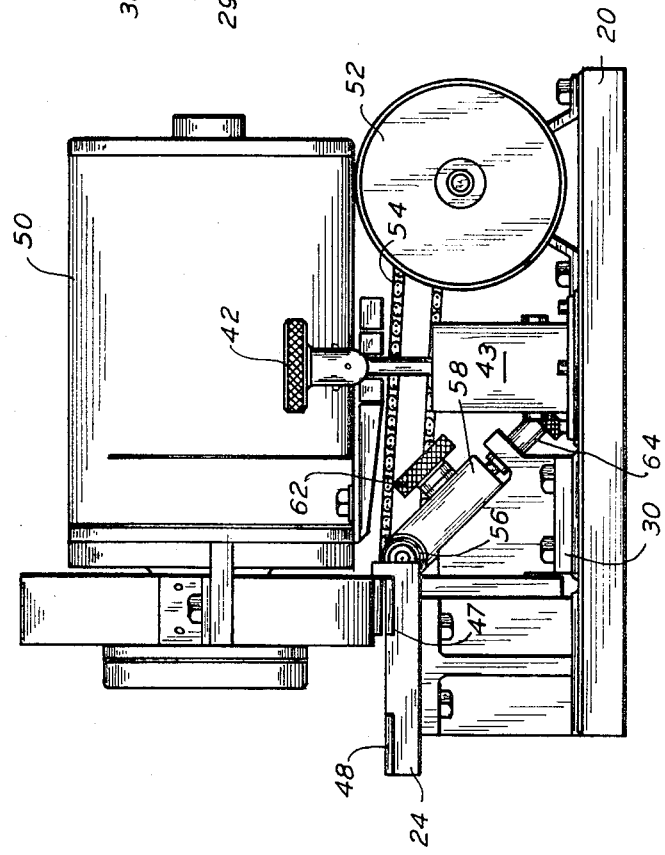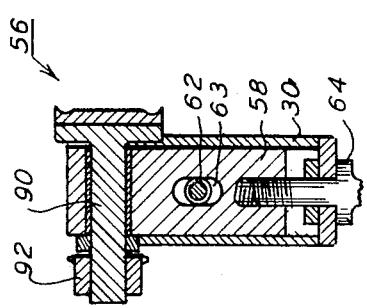

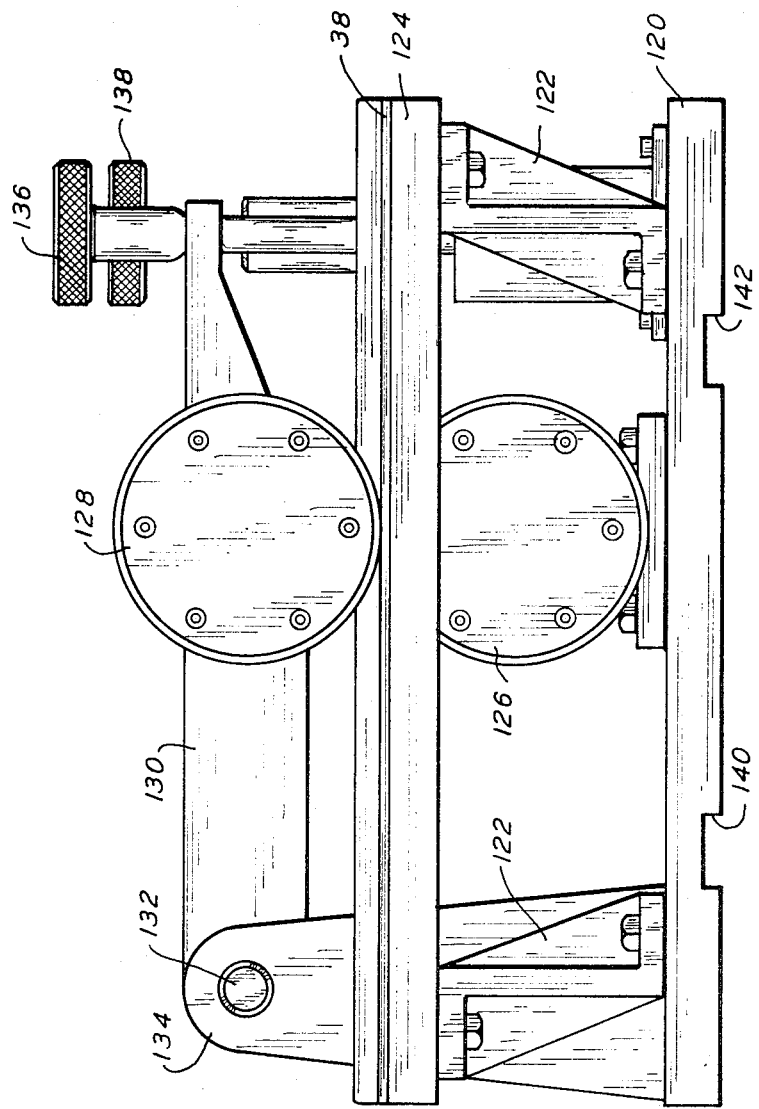

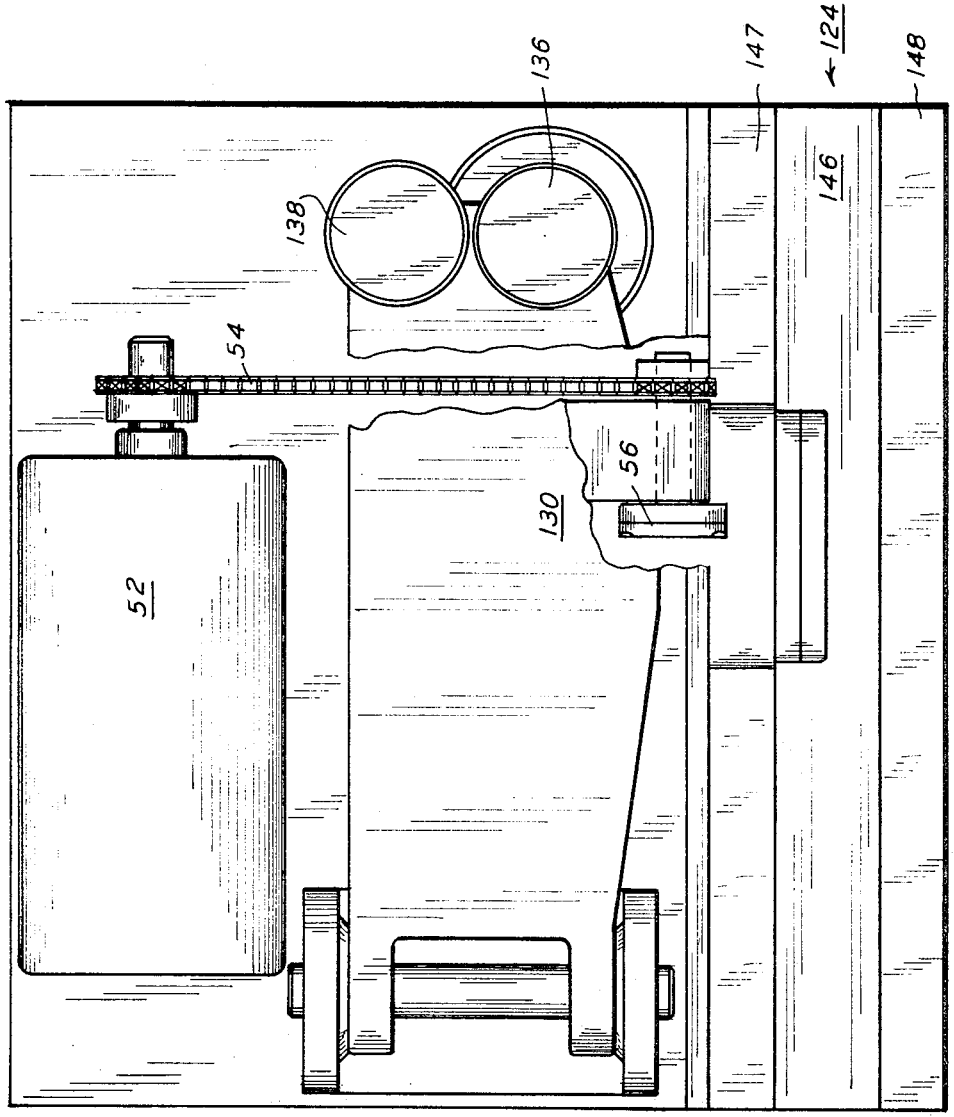

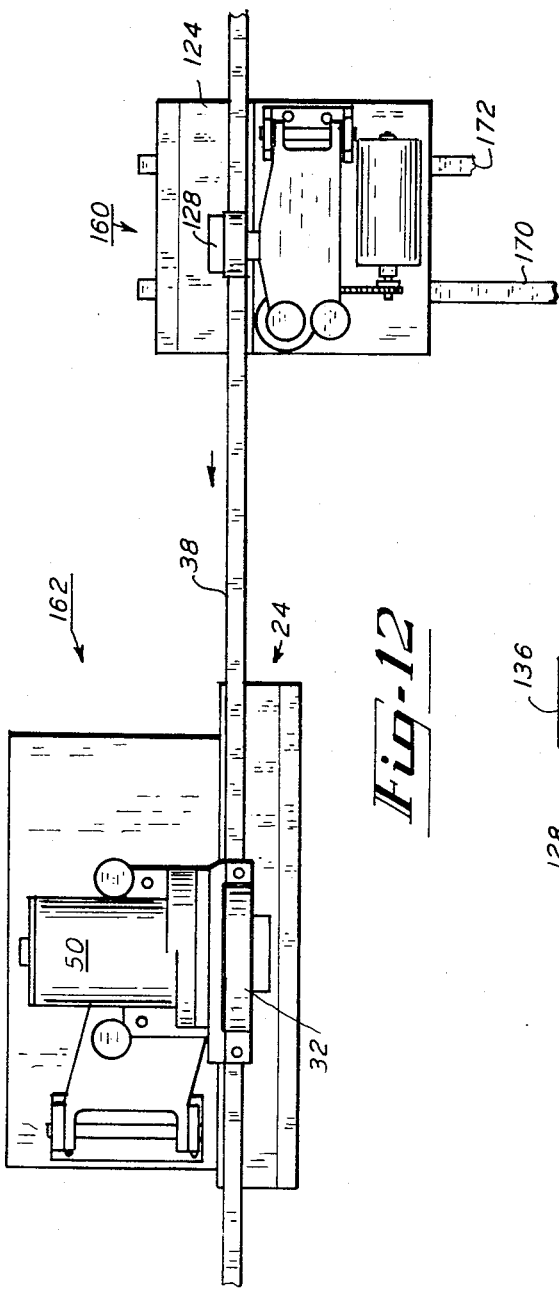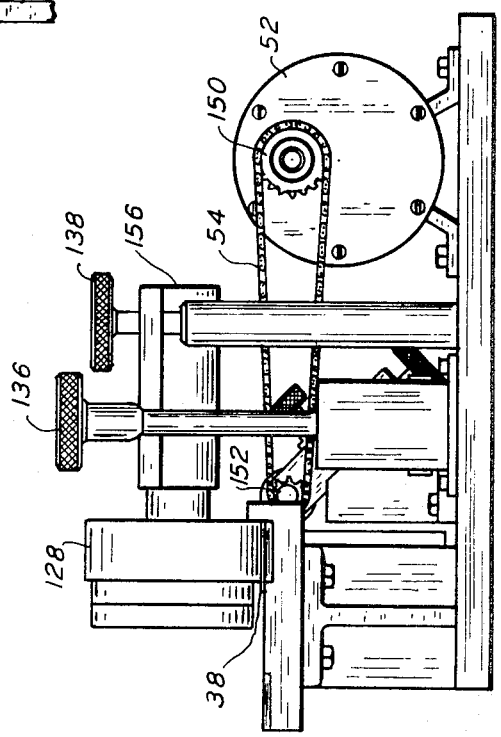

APPARATUS FOR DEBURRING A METAL STRIP

BACKGROUND OF THE INVENTION

1. Field of Art

With reference to the classification of art as established by the U.S. Patent Office the present invention pertains to the general class entitled, "Gear Cutting, Milling and Planing" and more particularly to the subclass of "with means to convey work" and particularly to the subclass of "with plural tools operative concurrently or sequentially during a single pass."

2. Description of the Prior Art

In the production of strip steel, aluminum, brass and the like it is a generally accepted procedure to slit the strip from a previously produced wide strip of material of determined thickness. This wide strip is slit into a multiple of strips of selected width by slitting equipment using circular slitting knives and a mating support roller. The resulting strip usually has a thin sliver of metal projecting generally outwardly from the roller supported side of each slit edge. These thin slivers are often razor sharp and are commonly identified as "burrs." These "burrs" or sharp edges must normally be removed before the strip is sold or used so as to prevent injury to the one handling the strip or to apparatus processing said strip for other products. Deburring apparatus is often provided at the slitting mechanism for if the burrs are not removed the burrs may affect the flatness of a rolled strip as it is wound on a spool.

Apparatus for performing such deburring operation is shown in U.S. Pat. No. 3,192,834 to LAINE as issued on July 6, 1965. Other apparatus is shown in U.S. Pat. No. 3,460,432 to PERSSON as issued on Aug. 12, 1969 and U.S. Pat. No. 2,944,374 also to PERSSON as issued on July 12, 1960. In these and other known apparatus it is customary to use power driven grinding wheels or plural scraper blades. Both methods leave much to be desired as the grinding wheel and the scrapers both have a tendency to "roll" the burr to leave a portion of the burr or sharp edge remaining.

In the preferred embodiment of this invention the sharp edge or "burred" edge is brought to and through a cutting station where either a circular hollow cutter is rotated to make a determined shallow cut at about a 45 degree angle to the plane of the stock strip, or in an alternate arrangement a full edge scraper is disposed to engage the edge of the strip to shape the edge as required. Either as a power driven cutter or as a fixed scraper, the edge deburring apparatus provides a power propulsive means to advance the strip and where desired a second deburring apparatus to remove the undesired sharp other or second edge of the strip. In using the circular hollow cutter on the full edge scraper the "burr" is directed upwardly toward mid-edge of the strip.

SUMMARY OF THE INVENTION

This invention may be summarized at least in part with reference to its objects. It is an object of this invention to provide, and it does provide, a power deburring tool for deburring or chamfering the sharp edge of strips of metal as the strip is brought to and past a rotating hollow-edged cutting disc.

It is a further object of this invention to provide, and it does provide, a pair of power deburring tools wherein like side and opposite edges of a metal strip are brought to and past a pair of rotating hollow-edged circular cutting discs.

It is a still further object of this invention to provide, and it does provide, a deburring tool wherein a circular cutting disc is rotated at a determined speed, said cutting disc being adjustable toward and away from the edge to be deburred to provide a determined edge chamfer.

The apparatus of this invention contemplated the providing of a worktable having a guide or stop rail in which are removably mounted a plurality of carbide wear buttons disposed to maintain the strip in a precise alignment on the table. These buttons additionally smooth or remove any feather edge left from the deburring provided by this apparatus. A pair of opposed rollers, the upper of which is adjustable, is cooperatively positioned with the worktable so as to grip the strip with one of the rollers being driven at a determined speed to advance the strip in way of a chamfering or edge trimming member. In the preferred embodiment the chamfering member is a hollow-edged circular disc driven by a motor so that a sharp cutting edge is presented to the advancing strip. A scraper member may be used in place of the power driven cutter. Where both edges of the strip are to be deburred and formed, a second apparatus having opposed rollers but no power driven means is provided. In all arrangements the burr edge is removed so that the applied force is upwardly and toward the guide or stop rail.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the apparatus for deburring a metal strip as adopted for use in removing the sharp edge from either one or both edges and showing a preferred means for advancing the strip. This specific embodiment and an alternate embodiment of a contoured tool cutter has been chosen for the purpose of illustration and description as shown in the accompanying drawings wherein:

BRIEF DESCRIPTION OF THE DRAWINGS

FIG. 3 represents an end view of the apparatus of FIGS. 1 and 2 and showing in particular a roller chain drive for a rotating cutter with the guard for the chain removed, the view taken on the line 3—3 and looking in the direction of the arrows;

FIG. 5 represents a partly diagrammatic sectional view showing a support bracket and a mechanism for moving the power-driven cutter back and forth into and away from the edge of the stock being trimmed;

FIG. 8 represents a partly diagrammatic side view of an alternate arrangement whereby a scraper-like cutter forms a determined contoured edge on the strip material;

FIG. 9 represents a side view of an alternate edge trimming apparatus similar to that of FIG. 1 but with this apparatus having no powered rollers and with both rollers being freely rotatable;

FIG. 10 represents a plan view which is also partly diagrammatic in that an upper portion of the apparatus of FIG. 9 is removed to show the drive arrangement for the circular cutter;

FIG. 11 represents an end view of the apparatus of FIGS. 9 and 10 with a cover or guard portion removed to show the internal arrangement of the cutter drive, and FIG. 12 represents a schematic plan view in reduced scale and showing the contemplated relationship of the apparatus of FIG. 1 and 9 as arranged to trim and deburr both edges of a metallic strip.

In the following description and in the claims various details will be identified by specific names for convenience. These names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE POWER-DRIVEN EDGE TRIMMER

Figure 1:
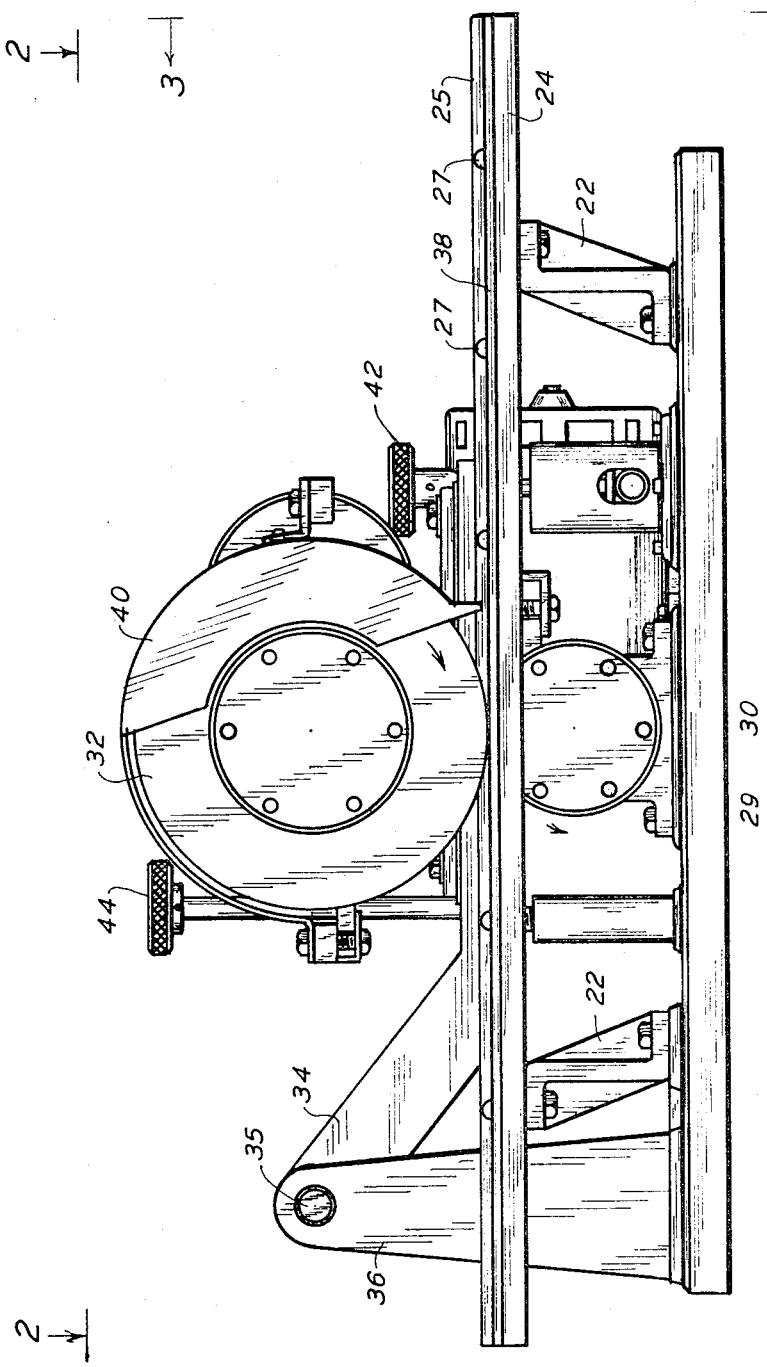
FIG. 1 represents a side view of a preferred embodiment of an edge deburring apparatus in which the strip stock is advanced by means of a power-driven roller adjustably movable toward a fixed supporting roller.

Referring now in particular to the deburring apparatus of FIGS. 1 through 8 and more particularly to FIG. 1 it is to be noted that the apparatus is carried upon a base 20 and mounted on this base is a pair of supports 22 which carry a table 24. This table is constructed so as to have an inner stop edge or face 25 into which are mounted a plurality of equally spaced hardened inserts 27. These inserts may be of carbide and the like and are made replaceable to accommodate wear. As they are disposed in the support stop edge or facing edge 25 the inserts establish an alignment for the strip as it is carried on the table. As they become worn they are adjusted to maintain this edge until excessive wear from the sharp edge of sheared or slitted strip stock require replacement. If no wear protection is provided the rough sharp edges of the strip readily wear away the infeeding portion of the stop edge and any remaining edge created by the deburring operation will wear the trailing stop edge unless protected by the inserts. The strip as it is moved on the table is urged against the stop to insure an effective deburring operation of the apparatus. A lower roller 29 is carried upon and by a pedestal 30 as more fully seen and described in conjunction with FIG. 4. On this pedestal the roller 29 is mounted so as to be freely rotatable on bearings carried by a shaft provided by the support 30. The face of the roller 29 and the table supports 22 are adjusted to bring the peripheral upper surface of the roller 29 into coincidence with the support surface of the table 24.

An upper roller 32 is carried by a clamp or bracket portion of an arm 34 whose left end is supported by a pivot pin 35. This pin is mounted in a support stanchion 36 fastened to the base 20. The arm 34 is adapted to be lifted around pin 35 so that the face of the roller 32 is precisely positioned above the support surface of table 24. This space is adjusted to permit the upper roller to grip a strip between the opposed faces of lower and upper rollers. A guard 40 is adjustable positioned around the upper roller cover portion of wheel 32 so that after the trimming of an edge of the strip of material the removed portions are prevented from flying toward the operator. A hold-down screw 42 is formed with swiveled and knurled upper handle having a shoulder adapted to engage a groove or cutout in the arm and retain the arm 34 in its lowered adjusted condition. A spring member, not shown, is carried in support 43 and is adapted to provide a determined bias while permitting the screw 42 to be urged upwardly. A stop screw 44 also has a knurled knob end and is adapted to limit the downward movement of and prevent the arm 34 from dropping below a determined lower limit. The adjusted screws 42 and 44 allow the arm to be brought into a determined position so that the roller 32 engages and pulls the strip of material through the deburring apparatus.

Figure 2:
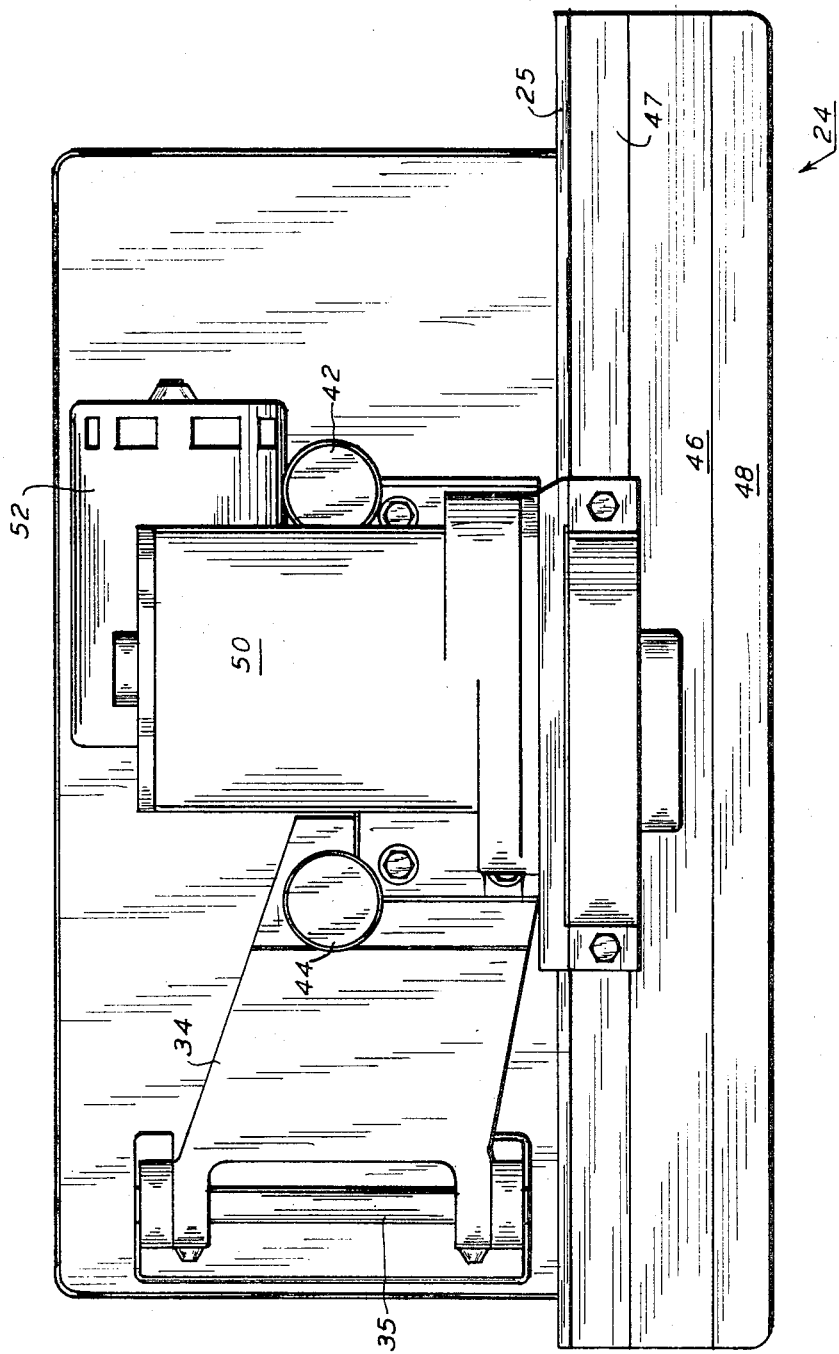
FIG. 2 represents a top or plan view of the apparatus of FIG. 1 the view being slightly enlarged and taken on the line 2—2 and looking in the direction of the arrows.

Referring now in particular to FIG. 2 it is to be noted that table 24 has a middle portion 46 between two grooved portions in which are mounted replaceable wear strip portions 47 and 48. These portions 46 and 48 are disposed to receive and support the material as it is fed through the apparatus. Usually these portions are of brass to prevent marking of stainless and aluminum material. A gear motor 50 is disposed to drive the upper roller 32 which as seen in FIG. 1 is rotated in the clockwise direction. The support and motor drive of upper roller 32 is seen in more detail in FIG. 4 to be hereinafter more fully described.

Referring now in particular to FIG. 3 it is to be noted that a gear motor 52 carried by and attached to the base 20 has a mounted sprocket, not seen, which is disposed to drive a roller chain 54. The moving chain 54 is carried on and engages a sprocket not seen in FIG. 3. As this sprocket is rotated it also rotates a cutter 56 carried by support block 58. This support block is movable in guides formed in the support base 30. A knurled hand screw 62 is disposed to pass through a slot 63 in support block 58 and when tightened to lock the block and mounted cutter 56 in a determined position after a selected adjustment has been performed. This adjustment may be accomplished, at least in part, by means of an adjusting screw 64 carried at and in the lower end of base 30. This screw is adjusted to provide means for limiting the downward travel of the block 58 until locked in position by hand screw 62. Clearly seen in this view is the upper surface of table 24 and the wear strips 47 and 48 carried in grooves formed in said table. These strips, usually of brass or perhaps of plastic, are replaced as required. Also to be particularly seen is the hold-down screw 42 which is adjusted to limit the upward movement of the upper roller and prevent the upper roller from lifting from the desired pressure engagement of the strip which is being deburred.

Figure 4:
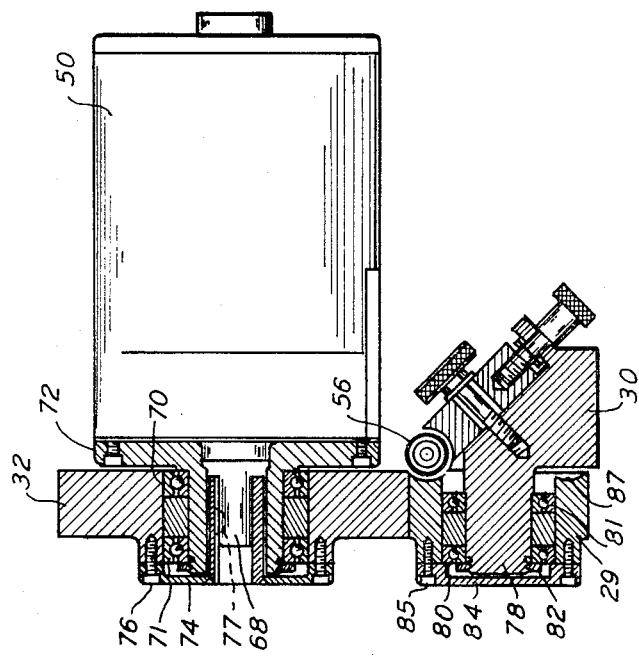
FIG. 4 represents a side view, partly in section and showing the apparatus of FIG. 3 in a partly diagrammatic manner, the view particularly disclosing the preferred construction of the power-drive roller and the bottom support roller in relation to the power-actuated corner trimming apparatus.

Referring now in particular to FIG. 4 it is to be noted that gear motor 50 has its shaft 68 disposed to drive or rotate the roller 32 which is rotatably supported by means of ball bearings 70 and 71 carried on a hollow shaft portion of a flange ring 72 fastened to the foreportion to the frame of motor 50. The shaft extension portion of attached flange ring 72 permits all load or thrust of the drive roller 32 to be removed from the motor shaft 68. The shaft 68 is sized to fit in a bore formed in a front drive plate 74 which is retained on roller 32 by means of cap screws 76. A key 77 is carried in a keyway in the shaft and an inwardly extending collar portion of drive plate 74. This key insures that as the shaft 68 is rotated the upper roller 32 is also rotated. It is to be noted in this view that the lower roller 29 is carried by a shaft portion 78 of support 30 upon which are mounted bearings 80 and 81 disposed to carry and support the load of the roller. The roller 29 is retained on the shaft by a bearing retainer nut 82 and dirt is kept from entering the bearings by a cover member 84 retained in place by means of cap screws 85. It is to be noted that the lower roller 29 is recessed on its inner face at portion 87 in order to provide a clearance for the cutter 56 as driven by gear motor 52 as seen in FIG. 3. The axis of the upper roller 32 and the lower roller 29 lie in a common plane in which plane also is the axis of disc cutter 56. In this arrangement the strip, although traveling, is positively grasped and positioned as the cutter 56 is rotated.

Referring next to FIG. 5 it is to be noted that disc cutter 56 is carried on a shaft member 90 and is driven by means of a sprocket 92. This sprocket is engaged and driven by chain 54 and motor 52. Adjusting screw 64 is rotatably retained in support base 30 and as it is rotated moves support block 58 up and down until clamped by means of hand screw 62.

CIRCULAR CUTTER OF FIGS. 6 AND 7

Figure 6:
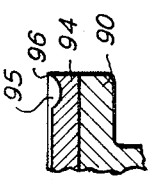
FIG. 6 represents a fragmentary and enlarged sectional view showing the preferred construction of the cup-shaped circular disc of this invention.
Figure 7:
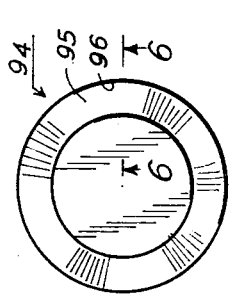
FIG. 7 represents a plan or face view of the cup-shaped circular disc as shown in FIG. 6.

Referring next to FIGS. 6 and 7 it is to be noted that the disc cutter 56 is preferably made with a carbide or hardened tool steel face portion 94. A circular concave recess 95 is formed in the face portion with the recess disposed to terminate at the outer edge of the cutter to form a sharp cutting edge 96. This edge is circular and as cutter 56 is rotated presents a new cutting edge to the advancing strip material 38. The cutter may be resharpened by grinding the outer periphery or by reshaping the recess. When worn beyond practical repair the portion 94 is removed from the base member 90 and a new face is mounted as by silver soldering or brazing after which the new face portion is finished ground.

Referring next to FIG. 8 there is shown an alternate edge deburring apparatus disposed to contour the edge of the strip material 38 by means of a particularly shaped scraper member 100. The support base 30 and cutter 56 are removed from base 20 and in their place a support 102 is attached to base 20. On the top of this support is mounted the scraper portion 100 having a determinedly shaped contour. The scraper blade is adjusted on the support so as to be in the plane of the axis of the upper and lower rollers, and to be brought in way of the strip 38 which is advanced by the upper and lower rollers 32 and 29 in the manner of FIGS. 1, 2 and 3. This blade is usually angled at a small angle to the path of the strip to provide some cutting action.

UNPOWERED DEBURRING APPARATUS OF FIGS. 9, 10 AND 11

Referring next to FIGS. 9, 10 and 11 there is shown an unpowered apparatus which is used in those instances where it is desired to have both edges of the strip deburred. When this is desired an unpowered edge deburring apparatus is provided like that in FIGS. 9, 10 and 11. In this embodiment, base 120 carries support brackets 122 upon which is mounted a table 124 similar, if not identical, to the table 24 shown in FIG. 1. A lower roller 126 is freely rotatable upon a support in the manner of FIGS. 1 and 4. An upper roller 128 is carried by an arm 130 pivotally attached by pin 132 to a pair of supports 134 and is adjustably retained at its right end by means of a hold-down screw 136. The arm is limited in its downward travel by means of a downward limiting screw knob 138 providing an adjustable stop in the manner of screw 64 of the apparatus of FIGS. 1 through 4. There is no power provided in this unit to drive either roller 126 or roller 128 as they engage the strip 38 to retain and guide the strip on the table. It is to be noted that in the base 120 there are parallel slots 140 and 142 formed and provided for a purpose to be hereinafter more fully described.

USE AND OPERATION

To use and operate the deburring apparatus of this invention it is contemplated that a strip of metallic material such as steel which has been cut from a larger strip as by slitting is fed to this apparatus for removing the sharp edges produced by said slitting operation. Whether one or both opposite edges are deburred only one power means is provided to propel the strip to be deburred. This same apparatus may be used to deburr long pieces which are not wound as coils. The present apparatus is also contemplated as being used in conjunction with a slitting machine as the strip stock is produced.

The strip of stock 38 is fed to the table 24 of the apparatus of FIG. 1 and against the stop edge 25 is brought to and under the upper roller 32 which is swung upwardly around hinge pin 35 while hold-down screw 42 is released from the right end of arm 34. Cutter 56 has been moved to a lower, non-chamfering condition by releasing hand screw 62 and manipulating adjusting screw 64. Roller 32 is now brought into engagement with the upper surface of strip 38 after which the hold-down screw 42 is brought into engagement with arm 34 and the screw 42 is manipulated to bring the roller 32 into driving engagement with the strip 38 as it is supported by table 24 and lower roller 29. Screw 44 is then adjusted to engage a support portion so that the down adjustment of the upper roller 32 is established.

The disc cutter 56 is now moved by screw 64 to engage the edge of the strip 38 by a determined amount after which the motors 50 and 52 are started. The gear motor 50 moves the strip of material while gear motor 52 drives the cutter 56. As the stock is advanced the rotating disc cutter presents a fresh cutting edge to the corner being chamfered. Guard 40 is adjusted to insure that any trimmed material removed from the strip is kept from the machine operator. The drive roller 32 and support roller 29, as well as the cutter 56, are adjusted to cause the strip 38 to be urged against the stop 25.

The support strips 47 and 48 are maintained in a precise plane and the upper surface of the lower support roller is in the same plane. The upper roller holds the strip stock against the lower roller and table to provide a determined grip on the advancing strip. In the plane through the axis of the upper and lower rollers is also the engagement point for the circular cutter. This enables a precise cut of the corner of the strip to be made and prevents the strip of material from being displaced upwardly by the cutter. The rotary cutter is rotated so as to engage the strip as it, the cutter rotatably moves from the table surface 24 upwardly in an arc toward the stop face 25. When the shaper of FIG. 8 using scraper blade 100 is used instead of the powered cutter 56, the blade 100 is positioned so that the shaping edge also lies in a plane through the axis of the upper and lower rollers.

When both edges of the strip are to be deburred or shaped the apparatus of FIGS. 9, 10 and 11 are placed on the guide rails 170 and 172 and the strip is fed to and between upper and lower rollers 128 and 126, both of which are free turning. Hold-down screw 136 is adjusted so that the upper and lower rollers have the desired spacing and cutter 56 is moved into a desired chamfer position. After the apparatus providing the power feed of the strip is actuated, the second apparatus is moved on rails 170 and 172 to provide the desired space for deburring the strip. The apparatus of FIG. 10 is clamped on the rails 170 and 172 so as to maintain a desired spacing of the cutters with the edges of the traveling strip.

In all circumstances it is essential that the upper and lower rollers grip the stock in a firm grasp. The edge of the material is engaged by the deburring tool at the precise gripping point so that at a particular point in time the strip is held in a vise-like manner while the cut is being made. It is contemplated that the deburring tool will remove the sharp edge by an upward cut which also moves to the stop rail. Any remaining feather edge of material is brushed off by the movement of the strip material over the hardened inserts 27. The upper and lower rollers although arranged as mating pairs are slightly skewed as to the path of the strip so as to urge the strip against the stop edge 25 during its travel along the table 24 or 124.

Although shown as some distance apart the powered deburring apparatus 162 and the slave apparatus 160 may be placed near to each other. It is, of course, contemplated that the slave apparatus could have its upper roller powered as long as it would travel at a surface speed equal to the other powered roller or the lead power roller is at a slightly greater surface speed than the trailing roller.

Although primarily directed to the problem of deburring strips of metal it is contemplated that the powered apparatus can also be used to chamfer one or more straight edges of square, rectangular or other plural-sided workpieces having a sharp or burred edge which is to be removed. These edges may occur from machining, shearing, slitting or grinding operation.

It is also to be noted that slave apparatus may be used where auxiliary power is used to pull the strip. For example, the windup mechanism used with a reel to roll the slit stock may be used to power the strip of stock. It is only necessary that the stock be positively advanced between the rollers which provide positive control of the stock.

The motor 50 which drives and supports upper roller 32 in FIG. 1 may alternately be mounted on a support or base and by a V-belt drive, or the like, drive this roller which would then be carried on a bearing retained arbor. The upper rollers 32 or 128 are contemplated as being supported so as to be spring biased toward the lower roller. This spring means is disposed so as to prevent breaking or bending or the roller support when an over-thick workpiece is fed between the rolls. If desired, the lower roller could instead be spring supported or a thickness sensing means could be provided to eliminate the use of a spring.

Terms such as "left," "right," "up," "bottom," "top," "front," "back," "in," "out," "clockwise," "counterclockwise" and the like are applicable to the embodiments shown and described in conjunction with the drawings. These terms are merely for the purposes of description and do not necessarily apply to the position in which the deburring apparatus may be constructed or used.

While a particular embodiment of the deburring apparatus and the cutter used therewith and alternates thereof have been shown and described it is to be understood the invention is not limited thereto since modifications may be made within the scope of the accompanying claims and protection is sought to the broadest extent the prior art allows.

What is claimed is:

1. Apparatus for conditioning the sharp edge of a workpiece by deburring, chamfering, shaping and the like, said workpiece being a strip, square, rectangular and like multi-edged piece of material, said apparatus including: (a) a base, (b) a table carried by said base and providing a workpiece support surface thereon, (c) a stop face portion extending above and along said table and secured thereto to provide a fixed guide for the movement of a piece of material over said table, (d) a lower roller rotatably supported so that its outer periphery is disposed in the same plane as the workpiece support surface of the table, (e) an upper roller rotatably carried on an arm member pivotally attached to a base-mounted support said roller movably mounted above said lower roller while its axis lies in substantially the same plane as the axis of the lower roller, (f) a clamp disposed to engage the arm and maintain the upper roller at an adjusted distance above said lower roller to provide means for positively gripping the workpiece as it is moved therebetween, said clamp including a spring-retaining means permitting upward movement of the arm against the bias of the spring when and as a workpiece thicker than the adjusted space is passed between said previously spaced upper and lower roller, (g) cutting means adjustably mounted so as to be movable into the path of the to-be conditioned edge of the workpiece, said edge being adjacent the top of the worktable and the stop face and with said cutting means disposed to engage said edge to be conditioned at a point which is at least substantially in the same plane as the common plane containing the axis of the upper and the lower roller, and (h) means for pulling the workpiece over the table and between the rollers at a determined rate of advance while the rollers and cutting means are mounted so as to urge the advancing workpiece against the stop face as the workpiece is moved over the table.

2. Apparatus for conditioning the edge of a workpiece as in claim 1 in which the upper roller is rotated by a motor means carried by said apparatus.

3. Apparatus for conditioning the edge of a workpiece as in claim 1 in which the stop face is provided with a plurality of receiving sockets in each of which is mounted an adjustable hardened insert, said inserts being retained so that their faces are aligned with said face to provide a guide path for one edge of the advancing workpiece.

4. Apparatus for conditioning the edge of a workpiece as in claim 3 in which the cutting means is a rotated disc of hardened material having a circularly grooved face portion contoured to provide an outer cutting edge, said rotated disc cutting the workpiece edge to be conditioned from its bottom surface to the edge in sliding engagement with said stop face and with any residual burr from said conditioning action being formed on said edge intermediate the top and bottom surface, said residual burr being dislodged by a wiping action against subsequent engagement with the hardened inserts in the stop face.

5. Apparatus for conditioning the edge of a workpiece as in claim 3 in which the cutting means is a scraper bit having its cutting edge contoured to desirably shape the edge of the workpiece as and when it passes between the spaced rollers, said scraper bit skewed slightly to provide a cutting angle with the workpiece while the cutting edge is substantially in the plane of the axis of the upper and the lower rollers.

6. Apparatus for conditioning the edge of a workpiece as in claim 1 in which the support surface is formed with a plurality of grooves into which is removably mounted brass strips adapted to support an advancing workpiece without marking the engaging surface of said workpiece.

7. Apparatus for conditioning parallel edges of a workpiece as in claim 1 in which there are two conditioning apparatus each carried by and on their own base and separated from each other with one arranged in a one hundred eighty degree relationship to the other and with one apparatus on each side of the workpiece with the stop faces of each spaced to slidably retain and engage an edge of an advancing workpiece.

8. Apparatus for conditioning both edges of a workpiece as in claim 7 in which the upper roller of the downstream apparatus is driven at a determined speed to provide the propulsive force for the advancing workpiece.

9. Apparatus for conditioning both edges of a workpiece as in claim 7 in which one of the conditioning apparatus has its base carried on rails and with the base movable on said rails so as to provide a selected spacing between edge conditioning paths provided by the pair of conditioning apparatus.

* * * * *